(12) United States Patent
Takagi et al.

(10) Patent No.: US 9,007,554 B2
(45) Date of Patent: Apr. 14, 2015

(54) LIQUID CRYSTAL OPTICAL APPARATUS AND IMAGE DISPLAY DEVICE

(71) Applicants: Ayako Takagi, Kanagawa-ken (JP); Shinichi Uehara, Tokyo (JP); Masako Kashiwagi, Kanagawa-ken (JP); Masahiro Baba, Kanagawa-ken (JP); Yuko Kizu, Kanagawa-ken (JP); Yoshiharu Momonoi, Kanagawa-ken (JP)

(72) Inventors: Ayako Takagi, Kanagawa-ken (JP); Shinichi Uehara, Tokyo (JP); Masako Kashiwagi, Kanagawa-ken (JP); Masahiro Baba, Kanagawa-ken (JP); Yuko Kizu, Kanagawa-ken (JP); Yoshiharu Momonoi, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 186 days.

(21) Appl. No.: 13/730,077

(22) Filed: Dec. 28, 2012

(65) Prior Publication Data

US 2013/0250223 A1     Sep. 26, 2013

(30) Foreign Application Priority Data

Mar. 22, 2012 (JP) ................................. 2012-066404

(51) Int. Cl.
| | | |
|---|---|---|
| G02F 1/1343 | (2006.01) | |
| G02F 1/1335 | (2006.01) | |
| G02B 27/22 | (2006.01) | |
| H04N 13/04 | (2006.01) | |
| G02F 1/29 | (2006.01) | |

(52) U.S. Cl.
CPC .... *G02F 1/134336* (2013.01); *G02F 1/134309* (2013.01); *G02B 27/2214* (2013.01); *H04N 13/0404* (2013.01); *G02F 2001/134381* (2013.01); *G02F 2001/294* (2013.01)

(58) Field of Classification Search
CPC ................. G02F 1/136286; G02F 1/133707; G02F 1/134336; G02F 1/1393; G02B 17/2214; G02B 27/26; H04N 13/0404

USPC ............................................ 349/139, 143, 15
See application file for complete search history.

(56) References Cited

U.S. PATENT DOCUMENTS

2007/0057621 A1* 3/2007 Cho et al. ....................... 313/496
2012/0162592 A1* 6/2012 Takagi et al. .................. 349/139
2013/0258218 A1* 10/2013 Takagi et al. ................... 349/15

FOREIGN PATENT DOCUMENTS

JP          2011-197640          10/2011

OTHER PUBLICATIONS

Notification of Reason(s) for Refusal issued by the Japanese Patent Office on Jun. 18, 2014, for Japanese Patent Application No. 2012-066404, and English-language translation thereof.
Notification of Comments issued by the Korean Patent Office on Feb. 25, 2014, for Korean Patent Application No. 10-2013-12215, and English-language translation thereof.

* cited by examiner

*Primary Examiner* — Mike Qi
(74) *Attorney, Agent, or Firm* — Finnegan, Henderson, Farabow, Garrett & Dunner, L.L.P.

(57) ABSTRACT

According to one embodiment, a liquid crystal optical apparatus includes a first substrate unit, a second substrate unit, and a liquid crystal layer. The first substrate unit includes a first substrate, first electrodes, and second electrodes. The first electrodes extend in a first direction. The second electrodes are disposed between the first electrodes. The second substrate unit includes a second substrate, a first opposing electrode, and a second opposing electrode. The second opposing electrode is separated from the first opposing electrode. The liquid crystal layer is provided between the first and second substrate units. The distance along the second direction between the central axis and a first separating region between the first opposing electrode and the second opposing electrode is longer than a distance between the central axis and the second electrode.

20 Claims, 7 Drawing Sheets

LIQUID CRYSTAL OPTICAL APPARATUS AND IMAGE DISPLAY DEVICE

CROSS-REFERENCE TO RELATED APPLICATIONS

This application is based upon and claims the benefit of priority from the prior Japanese Patent Application No. 2012-066404, filed on Mar. 22, 2012; the entire contents of which are incorporated herein by reference.

FIELD

Embodiments described herein relate generally to a liquid crystal optical apparatus and an image display device.

BACKGROUND

A liquid crystal optical apparatus is known that utilizes the birefringence of liquid crystal molecules to change the distribution of the refractive index according to the application of a voltage. There is a stereoscopic image display device that combines such a liquid crystal optical apparatus with an image display unit.

Such a stereoscopic image display device switches between a state in which an image displayed on the image display unit is caused to be incident on the eye of a human viewer as displayed on the image display unit and a state in which the image displayed on the image display unit is caused to be incident on the eye of the human viewer as multiple parallax images by changing the distribution of the refractive index of the liquid crystal optical apparatus. Thereby, a two-dimensional display operation and a three-dimensional image display operation are realized. Also, technology is known that modifies the path of the light by utilizing the optical principle of a Fresnel zone plate. High display quality is desirable for such display devices.

DETAILED DESCRIPTION

Figure 1:
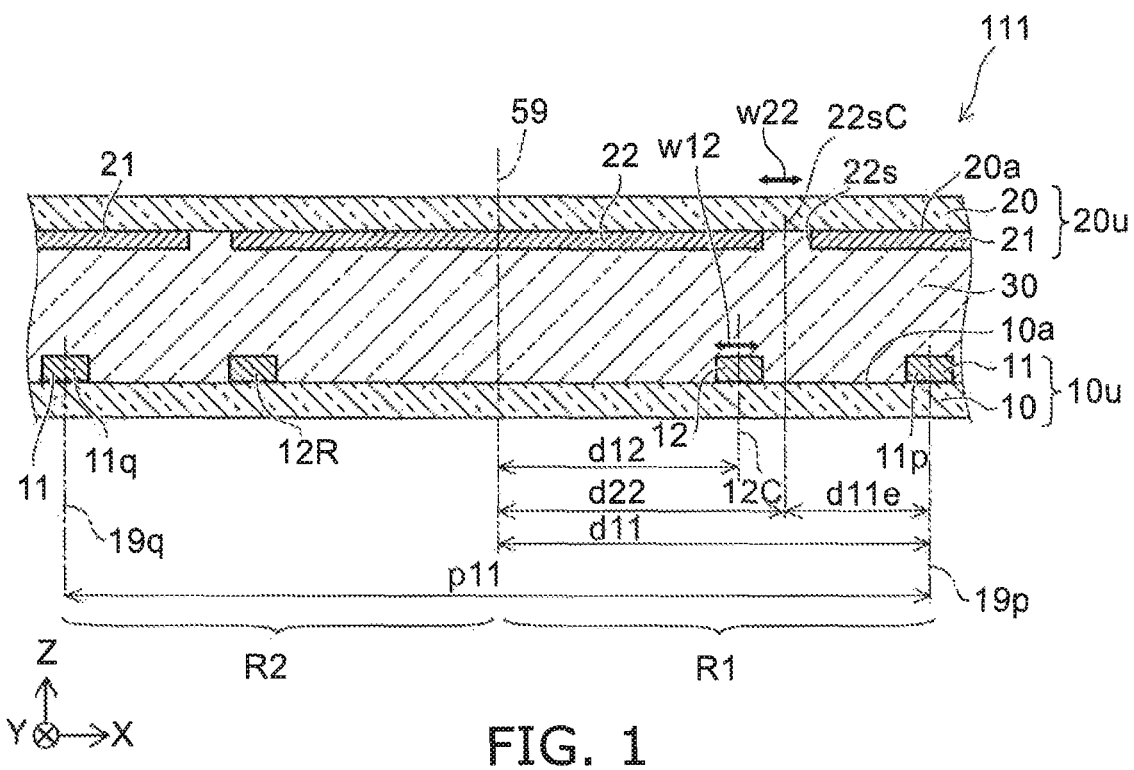
FIG. 1 is a schematic cross-sectional view illustrating the configuration of a liquid crystal optical apparatus according to a first embodiment.

According to one embodiment, a liquid crystal optical apparatus includes a first substrate unit, a second substrate unit, and a liquid crystal layer. The first substrate unit includes a first substrate having a first major surface, a plurality of first electrodes, and a plurality of second electrodes. The first electrodes are provided on the first major surface to extend in a first direction. The first electrodes are arranged in a second direction orthogonal to the first direction. The second electrodes are provided on the first major surface to extend in the first direction. The second electrodes are disposed in a first region between a central axis and one electrode of two most proximal first electrodes. The central axis is parallel to the first direction and passes through a midpoint of the two most proximal first electrodes. The second substrate unit includes a second substrate having a second major surface opposing the first major surface, a first opposing electrode, and a second opposing electrode. The first opposing electrode is provided on the second major surface to extend in the first direction to oppose the first electrodes. The second opposing electrode is provided on the second major surface and separated from the first opposing electrode to extend in the first direction. The second opposing electrode overlays the central axis. The liquid crystal layer is provided between the first substrate unit and the second substrate unit. The distance along the second direction between the central axis and a center of a first separating region between the first opposing electrode and the second opposing electrode is longer than a distance along the second direction between the central axis and a center of the second electrode.

Embodiments of the invention will now be described with reference to the drawings.

The drawings are schematic or conceptual; and the relationships between the thicknesses and the widths of portions, the proportions of sizes between portions, etc., are not necessarily the same as the actual values thereof. Further, the dimensions and/or the proportions may be illustrated differently between the drawings, even for identical portions.

In the drawings and the specification of the application, components similar to those described in regard to a drawing thereinabove are marked with like reference numerals, and a detailed description is omitted as appropriate.

First Embodiment

FIG. 1 is a schematic cross-sectional view illustrating the configuration of a liquid crystal optical apparatus according to a first embodiment.

As illustrated in FIG. 1, the liquid crystal optical apparatus 111 according to this embodiment includes a first substrate unit 10u, a second substrate unit 20u, and a liquid crystal layer 30. The liquid crystal layer 30 is provided between the first substrate unit 10u and the second substrate unit 20u.

The first substrate unit 10u includes a first substrate 10, multiple first electrodes 11, and multiple second electrodes 12. The first substrate 10 has a first major surface 10a. The multiple first electrodes 11 are provided on the first major surface 10a. Each of the multiple first electrodes 11 extends in a first direction. The multiple first electrodes 11 are arranged along a second direction. The second direction is orthogonal to the first direction.

The first direction is taken as a Y-axis direction. The second direction is taken as an X-axis direction. A direction perpendicular to the X-axis direction and the Y-axis direction is taken as a Z-axis direction.

Two of the multiple first electrodes 11 are illustrated in FIG. 1. The number of the multiple first electrodes 11 is arbitrary.

Two most proximal first electrodes 11 of the multiple first electrodes 11 will now be focused upon. A central axis 59 is between the most proximal first electrodes 11. The central axis 59 passes through the midpoint of a line segment connecting the X-axis direction centers of the two most proximal first electrodes 11. The central axis 59 is parallel to the Y-axis direction.

One of the two most proximal first electrodes 11 is taken as an electrode 11p. A position 19p of the electrode 11p is the position of the X-axis direction center of the electrode 11p. The other of the two most proximal first electrodes 11 is taken as an electrode 11q. A position 19q of the electrode 11q is the position of the X-axis direction center of the electrode 11q.

The region of the first major surface 10a between the central axis 59 and the position 19p of the electrode 11p which is the one of the two most proximal first electrodes 11 is taken as a first region R1. The region of the first major surface 10a between the central axis 59 and the position 19q of the electrode 11q which is the other of the two most proximal first electrodes 11 is taken as a second region R2. The direction from the central axis 59 toward the electrode 11p is taken as the +X direction. The direction from the central axis 59 toward the electrode 11q corresponds to the −X direction.

A distance p11 along the X-axis direction between the position 19p of the electrode 11p and the position 19q of the electrode 11q is twice a distance d11 along the X-axis direction between the position 19p of the electrode 11p and the central axis 59.

Each of the multiple second electrodes 12 extends in the first direction (the Y-axis direction) on the first major surface 10a. The second electrode 12 is disposed in the first region R1 when projected onto the X-Y plane (a plane including the Y-axis direction and the X-axis direction).

The first substrate unit 10u further includes an electrode 12R provided on the first major surface 10a in the second region R2. The configuration of the first substrate unit 10u in the second region R2 has substantially line symmetry with the configuration of the first substrate unit 10u of the first region R1 with the central axis 59 as an axis of symmetry. However, this may not be a rigorous line symmetry. For example, a micro asymmetry may be introduced based on the distribution of the alignment (e.g., the pretilt angle, etc.) of the liquid crystal layer 30. Although the configuration and the characteristics of the first region R1 are described hereinbelow, the configuration and the characteristics of the second region R2 also are similar.

The second substrate unit 20u includes a second substrate 20, a first opposing electrode 21, and a second opposing electrode 22. The second substrate 20 has a second major surface 20a opposing the first major surface 10a. The first opposing electrode 21 is provided on the second major surface 20a. The first opposing electrode 21 extends in the Y-axis direction to oppose the first electrodes 11. The second opposing electrode 22 is provided on the second major surface 20a.

The second opposing electrode 22 extends in the Y-axis direction while being separated from the first opposing electrode 21. The region (the gap) between the first opposing electrode 21 and the second opposing electrode 22 is taken as a first separating region 22s. The second opposing electrode 22 overlays the central axis 59 when projected onto the X-Y plane. The first separating region 22s (the gap) extends along the Y-axis direction.

In the specification, the state of being opposed includes not only the state of directly facing each other but also the state of facing each other with another component inserted therebetween.

The distance along the X-axis direction between the central axis 59 and an X-axis direction center 22sC of the first separating region 22s of the first region R1 recited above when projected onto the X-Y plane is taken as a distance d22. The distance along the X-axis direction between the central axis 59 and an X-axis direction center 12C of the second electrode 12 of the first region R1 when projected onto the X-Y plane is taken as a distance d12. In this embodiment, the distance d22 is longer than the distance d12.

The first separating region 22s of the electrodes provided in the second substrate unit 20u forms a pair with the second electrode 12 provided in the first substrate unit 10u. For one pair, the position of the first separating region 22s along the X-axis direction is shifted from the position of the second electrode 12 along the X-axis direction. In other words, an asymmetry is introduced to the disposition of the electrodes in the X-axis direction. Thereby, as described below, an asymmetry can be formed in the electric field distribution that is formed inside the liquid crystal layer 30; and the refractive index distribution characteristics of the liquid crystal optical apparatus 111 improve. Thereby, a liquid crystal optical apparatus that provides a high-quality display can be provided.

The first substrate 10, the first electrodes 11, the second electrodes 12, the second substrate 20, the first opposing electrode 21, and the second opposing electrode 22 are transmissive with respect to light. Specifically, these are transparent.

The first substrate 10 and the second substrate 20 may include, for example, a transparent material such as glass, a resin, etc. The first substrate 10 and the second substrate 20 have plate configurations or sheet configurations. The thicknesses of the first substrate 10 and the second substrate 20 are, for example, not less than 50 micrometers (μm) and not more than 2000 μm. However, the thicknesses are arbitrary.

For example, the first electrodes 11, the second electrodes 12, the first opposing electrode 21, and the second opposing electrode 22 include an oxide including at least one (one type) of element selected from the group consisting of In, Sn, Zn, and Ti. These electrodes may include, for example, ITO. For example, at least one selected from $In_2O_3$ and $SnO_3$ may be used. For example, the thicknesses of these electrodes are about 200 nanometers (nm) (e.g., not less than 100 nm and not more than 350 nm). For example, the thicknesses of the electrodes are set to be thicknesses to obtain a high transmittance with respect to visible light.

The disposition pitch of the first electrodes 11 (the distance p11 between the X-axis direction centers of the most proximal first electrodes 11) is, for example, not less than 10 μm and not more than 1000 μm. The disposition pitch is set to meet the desired specifications (the characteristics of the gradient index lens described below).

For example, the length (the width) of the first electrode 11 along the X-axis direction is not less than 5 μm and not more than 300 μm.

For example, the length (a width w12) of the second electrode 12 along the X-axis direction is not less than 5 μm and not more than 300 μm.

For example, the length (a width w22) of the first separating region 22s between the first opposing electrode 21 and the second opposing electrode 22 along the X-axis direction is not less than 5 μm and not more than 300 μm.

The liquid crystal layer 30 includes a liquid crystal material. The liquid crystal material may include a nematic liquid crystal (having a nematic phase at the temperature of use of the liquid crystal optical apparatus 111). The liquid crystal material has a positive dielectric anisotropy or a negative dielectric anisotropy. In the case of the positive dielectric anisotropy, the initial alignment of the liquid crystal of the liquid crystal layer 30 (the alignment when a voltage is not applied to the liquid crystal layer 30) is, for example, substantially a horizontal alignment. In the case of the negative dielectric anisotropy, the initial alignment of the liquid crystal of the liquid crystal layer 30 is substantially a vertical alignment.

In the specification, in the case of the horizontal alignment, the angle (the pretilt angle) between the X-Y plane and the director (the long axis of the liquid crystal molecules) of the liquid crystal is not less than 0° and not more than 30°. In the case of the vertical alignment, for example, the pretilt angle is not less than 60° and not more than 90°. The director of the liquid crystal of at least one selected from the initial alignment and the alignment when the voltage is applied has a component parallel to the X-axis direction.

Herein, the case is described where the dielectric anisotropy of the liquid crystal included in the liquid crystal layer 30 is positive and the initial alignment is substantially the horizontal alignment.

In the case of the substantially horizontal alignment, the director is substantially parallel to the X-axis direction in the initial alignment when projected onto the X-Y plane. For example, the angle (the absolute value of the angle) between the director and the X-axis direction is not more than 15 degrees when projected onto the X-Y plane. The orientation direction of the liquid crystal layer 30 proximal to the first substrate unit 10u is antiparallel to the orientation direction of the liquid crystal layer 30 proximal to the second substrate unit 20u. In other words, the initial alignment is not a splay alignment.

The first substrate unit 10u may further include an alignment film (not illustrated). The first electrodes 11 and the second electrodes 12 are disposed between the first substrate 10 and the alignment film of the first substrate unit 10u. The second substrate unit 20u may further include an alignment film (not illustrated). The first opposing electrode 21 and the second opposing electrode 22 are disposed between the second substrate 20 and the alignment film of the second substrate unit 20u. These alignment films may include, for example, polyimide. The initial alignment of the liquid crystal layer 30 is obtained by, for example, performing rubbing of the alignment films. The direction of the rubbing of the first substrate unit 10u is antiparallel to the rubbing direction of the second substrate unit 20u. The initial alignment may be obtained by performing light irradiation of the alignment films.

The liquid crystal alignment of the liquid crystal layer 30 is changed by applying voltages between the first opposing electrode 21 and the first electrodes 11 and between the second opposing electrode 22 and the second electrodes 12. A refractive index distribution is formed in the liquid crystal layer 30 according to this change; and the travel direction of the light that is incident on the liquid crystal optical apparatus 111 is changed by the refractive index distribution. The change of the travel direction of the light is mainly based on the refraction effect.

Figure 2:
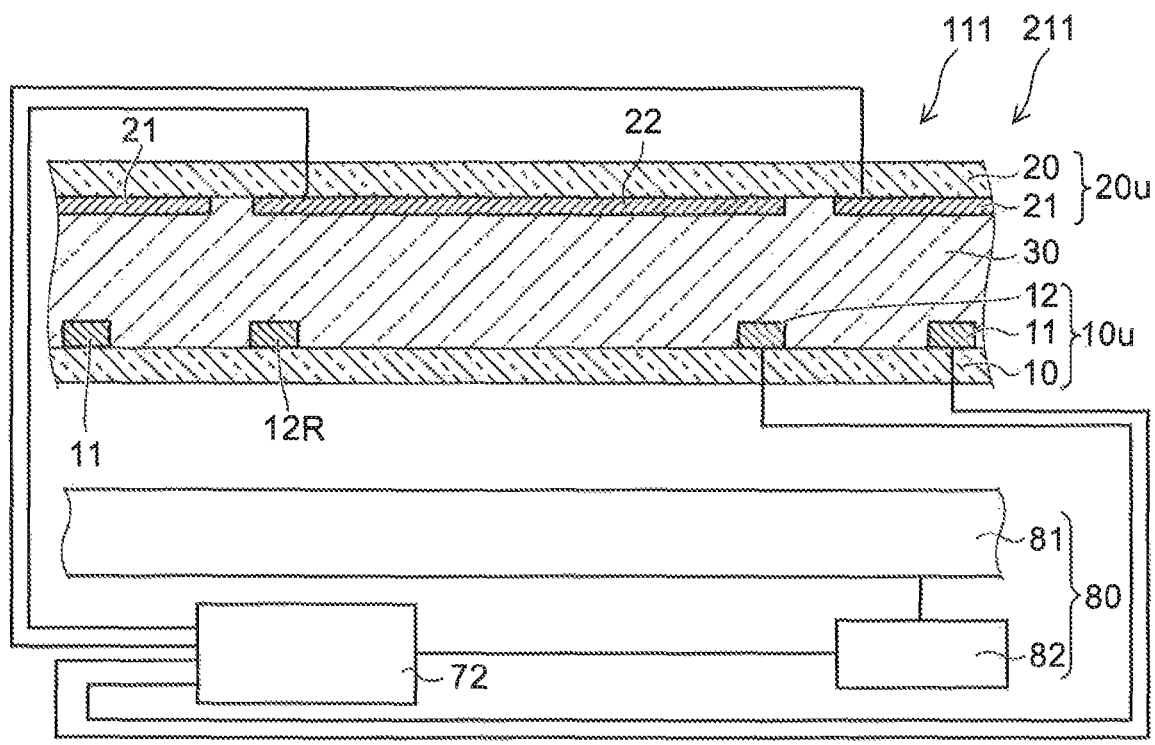
FIG. 2 is a schematic view illustrating the configuration of the liquid crystal optical apparatus according to the first embodiment.

FIG. 2 is a schematic view illustrating the configuration of the liquid crystal optical apparatus according to the first embodiment.

FIG. 2 also illustrates an example of the state of use of the liquid crystal optical apparatus 111. The liquid crystal optical apparatus 111 is used with an image display unit 80. An image display device 211 according to the embodiment includes the image display unit 80 and any liquid crystal optical apparatus according to the embodiments (in this example, the liquid crystal optical apparatus 111). Any display device may be used as the image display unit 80. For example, a liquid crystal display device, an organic EL display device, a plasma display, etc., may be used.

The image display unit 80 includes a display unit 81. The display unit 81 is stacked with the liquid crystal optical apparatus 111. The display unit 81 causes light including image information to be incident on the liquid crystal layer 30. The image display unit 80 may further include a display drive unit 82 that drives the display unit 81. The display unit 81 produces light that is modulated based on the signal supplied from the display drive unit 82 to the display unit 81. For example, the display unit 81 emits light including multiple parallax images. As described below, the liquid crystal optical apparatus 111 has an operating state in which the optical path is modified and an operating state in which the optical path substantially is not modified. For example, the image display device 211 provides a three-dimensional display by the light being incident on the liquid crystal optical apparatus 111 in the operating state in which the optical path is modified. For example, the image display device 211 provides a two-dimensional image display in the operating state in which the optical path substantially is not modified.

As illustrated in FIG. 2, the liquid crystal optical apparatus 111 may further include a drive unit 72. The drive unit 72 may be connected to the display drive unit 82 by a wired or wireless method (an electrical method, an optical method, etc.). The image display device 211 may further include a control unit (not illustrated) that controls the drive unit 72 and the display drive unit 82.

The drive unit 72 is electrically connected to the first electrodes 11, the second electrodes 12, the first opposing electrode 21, and the second opposing electrode 22.

The drive unit 72 applies a first voltage between the first opposing electrode 21 and the first electrodes 11 and a second voltage between the second opposing electrode 22 and the second electrodes 12.

For convenience in the specification, the state in which the potential is the same (is zero volts) between two electrodes also is taken to be included in the state in which the voltage is applied.

The first voltage and the second voltage may be direct-current voltages or alternating current voltages. For example, polarities of the first voltage and the second voltage may change periodically. For example, the potential of the first opposing electrode 21 may be fixed; and the potential of the first electrodes 11 may be changed as alternating current. The polarity of the potential of the first opposing electrode 21 may be changed periodically; and the potential of the first electrodes 11 may be changed in conjunction with the change of the polarity of the potential of the first opposing electrode 21 but with an opposite polarity. In other words, common inversion driving may be performed. Thereby, the power supply voltage of the drive circuit can be reduced; and the breakdown voltage specifications of the drive IC are relaxed.

In the case where the pretilt angle of the liquid crystal layer 30 is relatively small (e.g., not more than 10 degrees), a threshold voltage Vth relating to the change of the liquid crystal alignment of the liquid crystal layer 30 is relatively distinct. In such a case, for example, the first voltage and the second voltage are set to be greater than the threshold voltage Vth. The liquid crystal alignment of the liquid crystal layer 30 is changed by the application of the voltages; and the refractive index distribution is formed based on this change. The refractive index distribution is determined by the disposition of the electrodes and the voltages applied to the electrodes.

A model-like description of the refractive index distribution of the liquid crystal layer 30 will now be provided.

Figure 3A:
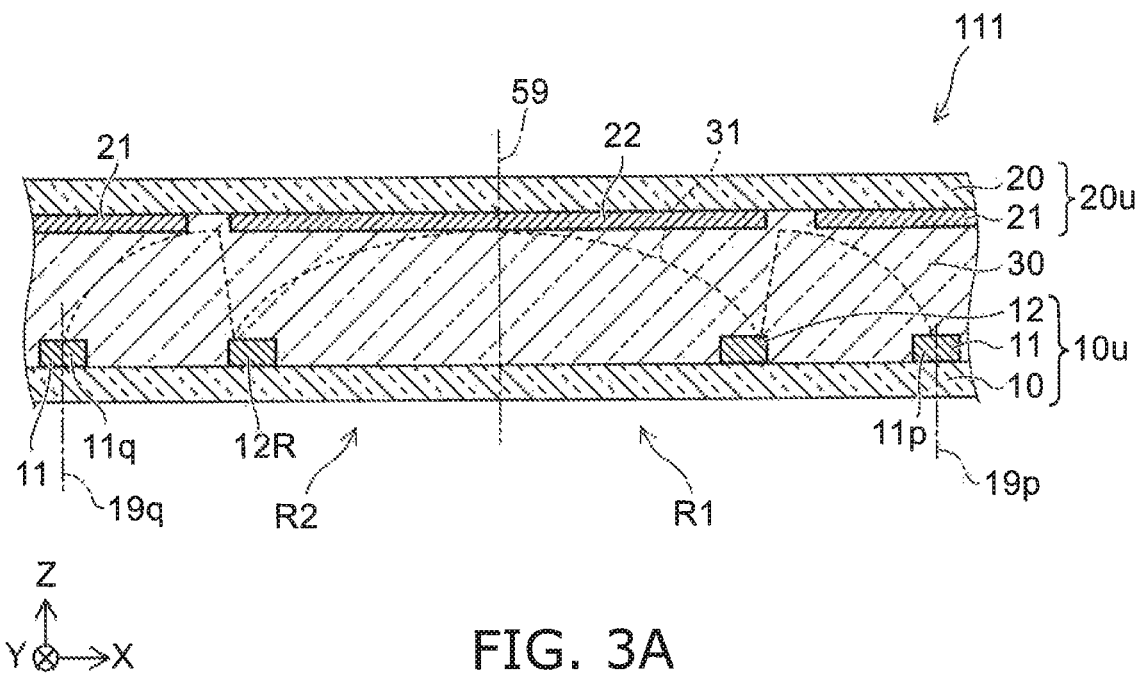
FIG. 3A and FIG. 3B are schematic views illustrating characteristics of the liquid crystal optical apparatus according to the first embodiment.
Figure 3B:
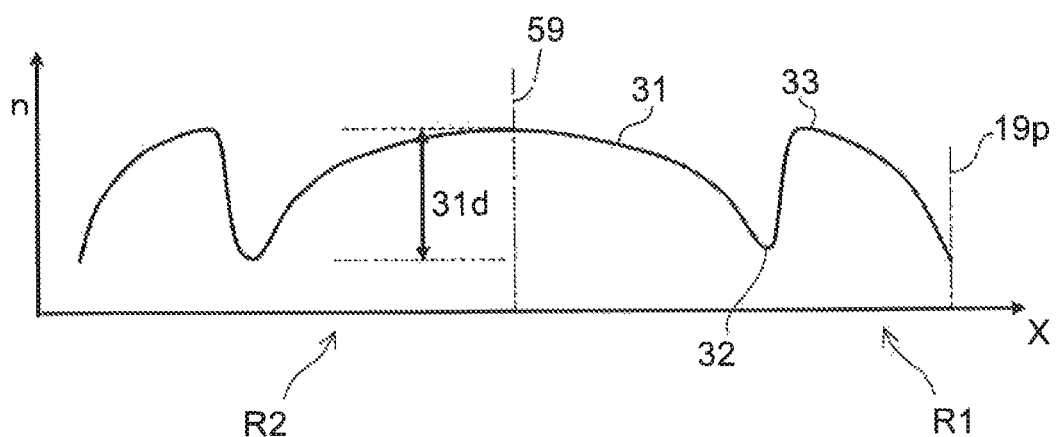

FIG. 3A and FIG. 3B are schematic views illustrating characteristics of the liquid crystal optical apparatus according to the first embodiment.

FIG. 3A is a model-like illustration of a refractive index distribution 31 and the configuration of the liquid crystal optical apparatus 111. FIG. 3B illustrates an example of the refractive index distribution 31 of the liquid crystal optical apparatus 111.

For example, the potential of the first electrode 11 is set to a VE potential; and the potential of the first opposing electrode 21 is set to a GND potential (the ground potential). The first voltage of the GND-VE potential difference is applied between the first opposing electrode 21 and the first electrode 11. An electric field that includes a Z-axis direction component is applied in this region.

For example, the potential of the second electrode 12 is set to a VF potential; and the potential of the second opposing electrode 22 is set to the GND potential. The second voltage of the GND-VF potential difference is applied between the second opposing electrode 22 and the second electrode 12. An electric field that includes a Z-axis direction component is applied in this region. The potential (the VE potential) of the first electrode 11 may be different from or the same as the potential (the potential VF) of the second electrode 12. The potential of the first opposing electrode 21 may be the same as or different from the potential of the second opposing electrode 22.

An alignment (e.g., the vertical alignment) in which the tilt angle of the liquid crystal is large is formed in the liquid crystal layer 30 in the regions where the first voltage and the second voltage are applied. The effective refractive index of these regions is the refractive index ($n_o$) with respect to ordinary light.

On the other hand, for example, the initial alignment (e.g., the horizontal alignment) is formed in the region between the first electrode 11 and the second electrode 12 and the region between the second electrode 12 and the electrode 12R. The refractive index of these regions with respect to the light that vibrates in the X-axis direction is the refractive index ($n_e$) with respect to extraordinary light. Thereby, the refractive index distribution 31 is formed in the liquid crystal layer 30.

In the refractive index distribution 31, for example, the change of the refractive index (a refractive index difference 31d) is not less than about 20% and not more than about 80% of the difference between the refractive index with respect to extraordinary light and the refractive index with respect to ordinary light.

For example, the refractive index of the liquid crystal layer 30 has a minimum proximal to the portion opposing the central portion of the first electrode 11 and proximal to the portion opposing the central portion of the second electrode 12. The refractive index of the liquid crystal layer 30 has a maximum proximal to the central axis 59 and proximal to the first separating region 22s.

As illustrated in FIG. 3A, for example, the refractive index distribution 31 has a configuration corresponding to the distribution of the thickness of a Fresnel lens. The liquid crystal optical apparatus 111 functions as a liquid crystal GRIN lens (Gradient Index lens) in which the refractive index changes in the plane.

In the refractive index distribution 31 that is formed, the position of the central axis 59 corresponds to the position of the lens center; and the positions of the electrode 11p and the electrode 11q correspond to the positions of the lens ends.

FIG. 3B is a model-like illustration of the refractive index distribution 31 of the liquid crystal optical apparatus 111 when the voltages recited above are applied. In FIG. 3A, the horizontal axis is the X axis; and the vertical axis is a refractive index n (the effective refractive index).

As illustrated in FIG. 3B, the actual refractive index distribution 31 has the characteristics of a smooth curved configuration in which the change rate of the refractive index of the characteristics illustrated in FIG. 3A is reduced by the continuity of the liquid crystal alignment.

As illustrated in FIG. 3B, the pair of the second electrode 12 and the first separating region 22s of the liquid crystal optical apparatus 111 forms a minimum point 32 and a maximum point 33 of the refractive index. In other words, the refractive index of the refractive index distribution 31 of the liquid crystal layer 30 in the first region R1 is high at the central axis 59, decreases along the +X direction, and has a minimum proximal to the second electrode 12. The refractive index that is proximal to the position of the pair of the second electrode 12 and the first separating region 22s increases and has a maximum that is proximal to the first separating region 22s. The refractive index decreases from the first separating region 22s toward the first electrode 11.

The liquid crystal optical apparatus 111 has the characteristics of a Fresnel lens in which multiple curved surfaces are combined. Thereby, this corresponds to reducing the thickness of the lens while obtaining the same optical characteristics. In the liquid crystal optical apparatus 111, the thickness of the liquid crystal layer 30 can be thin; and the amount of the liquid crystal material that is used can be reduced. Further, the response rate of the liquid crystal layer 30 increases.

In the liquid crystal optical apparatus 111, the pair of the second electrode 12 and the first separating region 22s forms the minimum point 32 and the maximum point 33 of the refractive index. Thereby, the change from the minimum point 32 to the maximum point 33 of the refractive index can be abrupt. The change of the refractive index (the decrease of the refractive index) can be gradual in the region between the central axis 59 and the second electrode 12 and the region between the first separating region 22s and the first electrode 11. In other words, in the embodiment, the refractive index increase rate along the +X direction is higher than the refractive index decrease rate along the +X direction. For example, this refractive index distribution corresponds to the distribution of the thickness of a lens having a Fresnel lens-like configuration; and good optical characteristics can be obtained.

For example, in a reference example in which the first separating region 22s is not made between the electrodes of the second substrate unit 20u, the lines of electric force along the X-axis direction proximal to the second electrode 12 have a configuration that is substantially horizontally symmetric along the X-axis direction. Therefore, the refractive index increase rate along the +X direction proximal to the second electrode 12 is substantially the same as the refractive index decrease rate along the +X direction. Therefore, at the portion where the refractive index increases, light is guided toward unintended directions particularly for oblique light. In other words, stray light occurs. Therefore, for example, crosstalk occurs; and the display quality is low.

Conversely, in the liquid crystal optical apparatus 111 according to the embodiment, the first separating region 22s is provided for the electrodes of the second substrate unit 20u. The second electrode 12 of the first substrate unit 10u and the first separating region 22s of the second substrate unit 20u form one pair; and an electric field distribution (a distribution of the lines of electric force) that is asymmetrical can be formed. Thereby, the refractive index increase rate along the +X direction can be higher than the refractive index decrease rate along the +X direction. The change from the minimum point 32 to the maximum point 33 of the refractive index can be abrupt. Therefore, the stray light can be suppressed. Then, the change (the decrease) of the refractive index along the +X direction can be gradual; and good lens effects are obtained.

According to the liquid crystal optical apparatus 111 according to the embodiment, a liquid crystal optical apparatus that provides a high-quality display can be provided In FIG. 3A, an electric field that is horizontally asymmetric around the second electrode 12 (asymmetrical with respect to a line parallel to the Y-axis direction and passing through the X-axis direction center of the second electrode 12) occurs in the case where the potential of the first electrode 11 is set to be different from the potential of the second electrode 12. The tilt angle of the liquid crystal molecules increases abruptly in the region of one end (e.g., a lens-end side) of the second electrode 12. The tilt direction in this region is the same tilt direction as that of the initial alignment. In this region, the refractive index of the liquid crystal layer 30 decreases abruptly; and a Fresnel-type jump of the refractive index occurs. On the other hand, in the region of the other end (the end on the lens-center side) of the second electrode 12, the change of the tilt angle of the liquid crystal molecules is gradual. Although the tilt direction is different from that of the initial alignment in this region, the occurrence of alignment disorder (e.g., reverse tilt and/or twist) in this portion is suppressed because the change of the tilt angle of the liquid crystal molecules is gradual.

Figure 4:
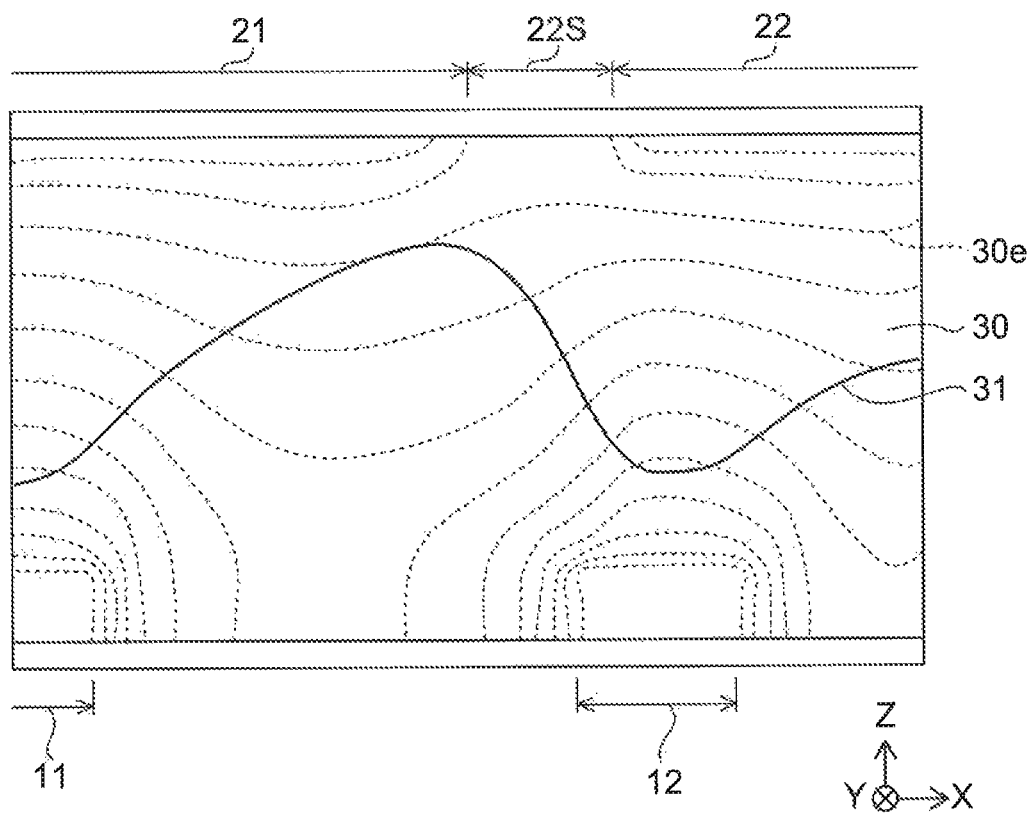
FIG. 4 is a schematic view illustrating characteristics of the liquid crystal optical apparatus according to the first embodiment.

FIG. 4 is a schematic view illustrating characteristics of the liquid crystal optical apparatus according to the first embodiment.

FIG. 4 is an example of simulation results of characteristics of the electric field occurring in the liquid crystal layer 30 when the voltage is applied in the liquid crystal optical apparatus 111 and the characteristics of the refractive index of the liquid crystal layer 30 when the voltage is applied. In FIG. 4, the broken lines are equipotential curves 30e. The solid line is the curve of the refractive index distribution 31.

For example, as illustrated in FIG. 4, the electric field between the first opposing electrode 21 and the first electrode 11 decreases along the X-axis direction toward the lens center. Therefore, the alignment that is formed approaches the initial alignment (e.g., the horizontal alignment) from the first electrode 11 toward the second electrode 12. The refractive index in this region with respect to the light that vibrates in the X-axis direction is the refractive index ($n_e$) with respect to extraordinary light. On the other hand, the refractive index decreases due to the electric field on the second electrode 12 between the second opposing electrode 22 and the second electrode 12. Thereby, a Fresnel-type refractive index distribution is formed. There is a region (the first separating region 22s) between the first opposing electrode 21 and the second opposing electrode 22 where an electrode is not provided.

Thereby, a refractive index distribution having an asymmetrical lens configuration can be formed at the portion of the first separating region 22s.

On the other hand, the potential (the VF potential) of the second electrode 12 may be set to be the same as the potential (the VE potential) of the first electrode 11; and the potential of the second opposing electrode 22 may be set to be the same as the potential of the first opposing electrode 21 (e.g., the GND potential). The first voltage of the GND-VE potential difference is applied between the second opposing electrode 22 and the second electrode 12. In this region, an electric field that includes a Z-axis direction component is applied. In such a case as well, an alignment (e.g., the vertical alignment) in which the tilt angle of the liquid crystal is large is formed in the liquid crystal layer 30 in the region where the first voltage and the second voltage are applied. The initial alignment (e.g., the horizontal alignment) is formed in the region between the first electrode 11 and the second electrode 12 and the region between the second electrode 12 and the electrode 12R. Thereby, the refractive index distribution 31 is formed in the liquid crystal layer 30.

For example, the refractive index has a minimum proximal to the portion of the liquid crystal layer 30 opposing the central portion of the first electrode 11 and proximal to the portion of the liquid crystal layer 30 opposing the central portion of the second electrode 12. The refractive index of the liquid crystal layer 30 has a maximum proximal to the central axis 59 and proximal to the first separating region 22s.

In this example as illustrated in FIG. 1, the first separating region 22s does not overlay the second electrode 12 when projected onto the X-Y plane. In other words, the second electrode 12 does not oppose the first separating region 22s along the Z-axis direction. Thereby, the increase rate of the refractive index can be increased further. However, the embodiment is not limited thereto. As described below, a portion of the first separating region 22s may oppose the second electrode 12.

For example, in the liquid crystal optical apparatus 111, the width w12 of the second electrode 12 along the X-axis direction is narrower than the width w22 of the first separating region 22s along the X-axis direction. Thereby, a good refractive index distribution can be obtained easily.

In FIG. 3A, the potential of the first electrode 11 may be set to the VE potential; the potential of the first opposing electrode 21 may be set to the GND potential; the potential of the second electrode 12 may be set to the GND potential; and the potential of the second opposing electrode 22 may be set to the VF potential. In such a case, the VF potential may be the same as or different from the VE potential.

In the specification, the GND potential is, for example, the ground potential. The GND potential may not be the ground potential and may be any potential; and in the case where common inversion driving is performed, for example, the GND potential may be changed periodically between 0 volts and a prescribed voltage (e.g., 5 volts, etc.). The VE potential and the VF potential are potentials that are different from the GND potential; and the polarities of the VE potential and the VF potential with respect to the GND potential are arbitrary.

The potential of the first electrode 11 may be set to the GND potential; the potential of the first opposing electrode 21 may be set to the VE potential; the potential of the second electrode 12 may be set to the GND potential; and the potential of the second opposing electrode 22 may be set to the VF potential. In such a case, the VF potential may be the same as or different from the VE potential.

Thus, in the embodiment, a first potential difference is formed between the first opposing electrode 21 and the first electrode 11; and a second potential difference is formed between the second opposing electrode 22 and the second electrode 12. The polarity and the absolute value of the first potential difference may be different from the polarity and the absolute value of the second potential difference.

Common inversion driving in which the relative polarities are changed temporally may be performed in the setting (the driving) of the potentials recited above.

For example, in the embodiment, the absolute value of the difference (a distance d11e illustrated in FIG. 1) between the distance d11 along the X-axis direction from the central axis 59 to the one electrode 11p of the two most proximal first electrodes 11 recited above and the distance d22 along the X-axis direction from the central axis 59 to the X-axis direction center 22sC of the first separating region 22s is less than ½ of the distance d11. In other words, the position of the center 22sC of the first separating region 22s is distal to the central axis 59 and proximal to the electrode 11p when projected onto the X-Y plane. Thereby, the subordinate lens of the Fresnel lens is formed in the refractive index distribution that is formed at a position proximal to the lens end. Thereby, good lens effects can be obtained easily.

For example, the distance d11e recited above is not more than the thickness of the liquid crystal layer 30 (the thickness of the liquid crystal layer 30 along the Z-axis direction). Thereby, a good refractive index distribution can be obtained easily.

However, the description recited above is an example of the configuration of the liquid crystal optical apparatus 111; and the embodiment is not limited thereto. The positions and/or the dimensions of the electrodes may be set to match the various characteristics of the refractive index distribution 31 which can be adjusted by controlling the voltages applied to the electrodes.

As described below, there are many cases where the relationships recited above do not apply when the combination of the second electrode 12 and the first separating region 22s is multiply provided in the first region R1.

In the image display device 211 as described above, the potential of the first opposing electrode 21 may be the same as or different from the potential of the second opposing electrode 22. The potential of the first electrode 11 may be the same as or different from the potential of the second electrode 12. In the case of being set to the same potential, for example, the insulating layer that is provided in the portion where the lead interconnect of the first electrode 11 crosses the lead interconnect of the second electrode 12 can be omitted. Therefore, for example, the electrical connections between the electrodes and the drive unit 72 are easier. For example, the configuration can be simplified; and the yield can be improved. For example, the cost of the liquid crystal optical apparatus can be reduced.

Figure 5:
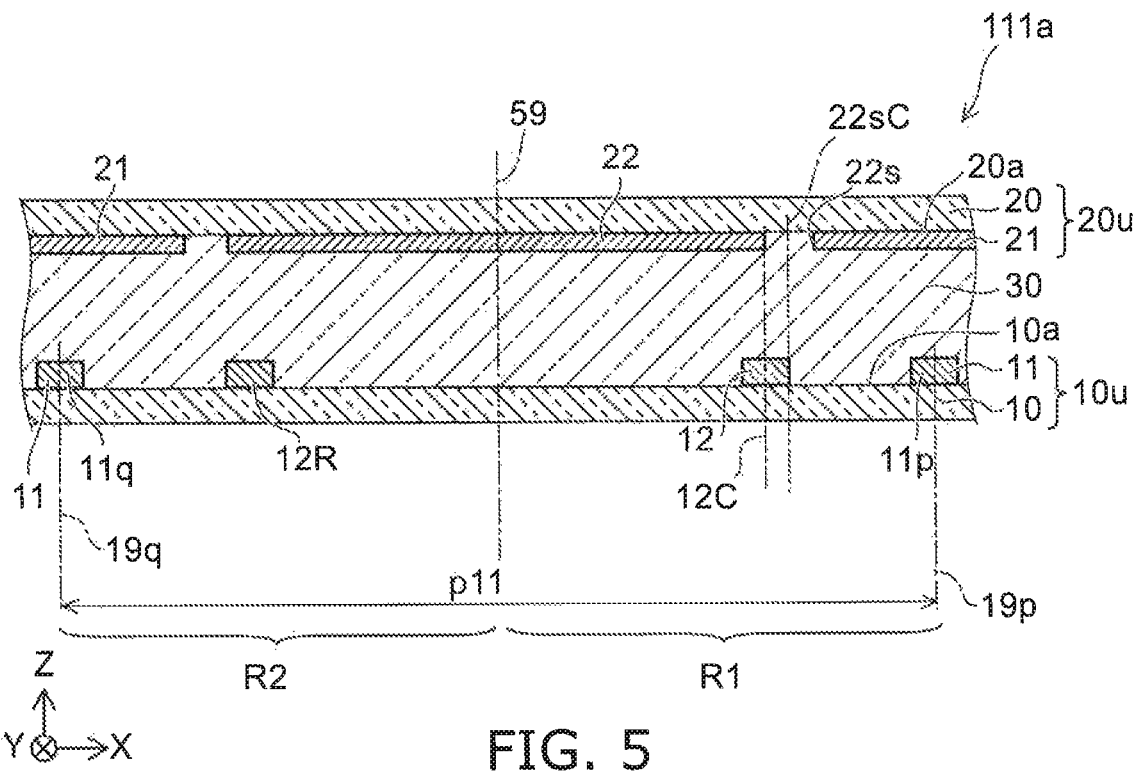
FIG. 5 is a schematic cross-sectional view illustrating the configuration of another liquid crystal optical apparatus according to the first embodiment.

FIG. 5 is a schematic cross-sectional view illustrating the configuration of another liquid crystal optical apparatus according to the first embodiment.

In the liquid crystal optical apparatus 111a according to this embodiment as illustrated in FIG. 5, a portion of the first separating region 22s opposes the second electrode 12. Otherwise, the liquid crystal optical apparatus 111a may be similar to the liquid crystal optical apparatus 111, and a description is omitted.

In the liquid crystal optical apparatus 111a according to the embodiment, similarly to the liquid crystal optical apparatus 111, a liquid crystal optical apparatus that provides a high-quality display can be provided.

Figure 6:
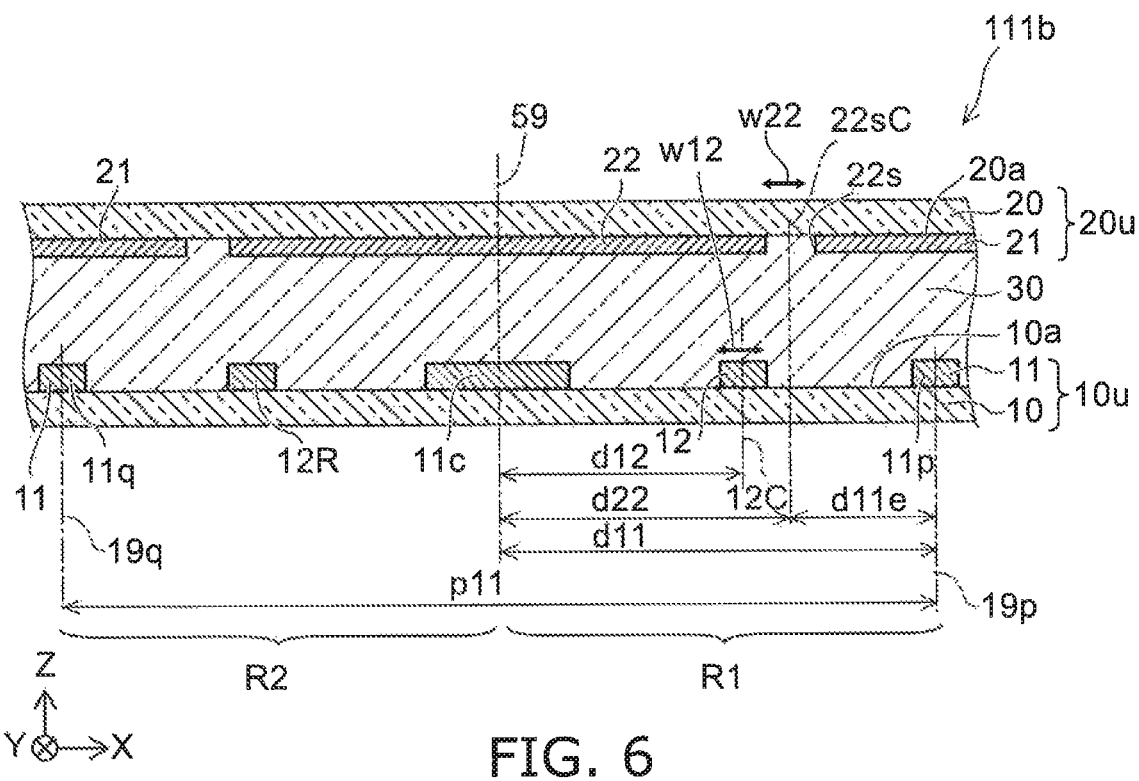
FIG. 6 is a schematic cross-sectional view illustrating the configuration of another liquid crystal optical apparatus according to the first embodiment.

FIG. 6 is a schematic cross-sectional view illustrating the configuration of another liquid crystal optical apparatus according to the first embodiment.

In the liquid crystal optical apparatus 111b according to this embodiment as illustrated in FIG. 6, the first substrate unit 10u further includes a central portion electrode 11c. The central portion electrode 11c extends in the Y-axis direction on the first major surface 10a. The central portion electrode 11c is separated from the second electrode 12 and overlays the central axis 59 when projected onto the X-Y plane. The central portion electrode 11c may include, for example, the same material as that of the first electrode 11, etc. Otherwise, the liquid crystal optical apparatus 111b may be similar to the liquid crystal optical apparatus 111, and a description is omitted.

In the liquid crystal optical apparatus 111b, for example, the potential of the first electrode 11 is set to the GND potential; and the potential of the first opposing electrode 21 is set to the VE potential. The potential of the second electrode 12 is set to the VE potential; and the potential of the second opposing electrode 22 is set to the GND potential. The potential of the central portion electrode 11c is set to the GND potential. Thereby, in the region corresponding to the lens center, the voltage applied to the liquid crystal layer 30 is zero volts; and the initial liquid crystal alignment (e.g., the horizontal alignment) is maintained. Thereby, for example, the design ranges of the voltages applied to the first electrode 11, the second electrode 12, the first opposing electrode 21, and the second opposing electrode 22 increase; and as a result, a good refractive index distribution 31 is obtained more easily. In such a case as well, common inversion driving is applicable.

The voltages applied to the electrodes of the liquid crystal optical apparatuses 111, 111a, and 111b are arbitrary. For example, the potential of the first electrode 11 may be different from the potential of the second opposing electrode 22. The potential of the second electrode 12 may be different from the potential of the first opposing electrode 21.

Figure 7:
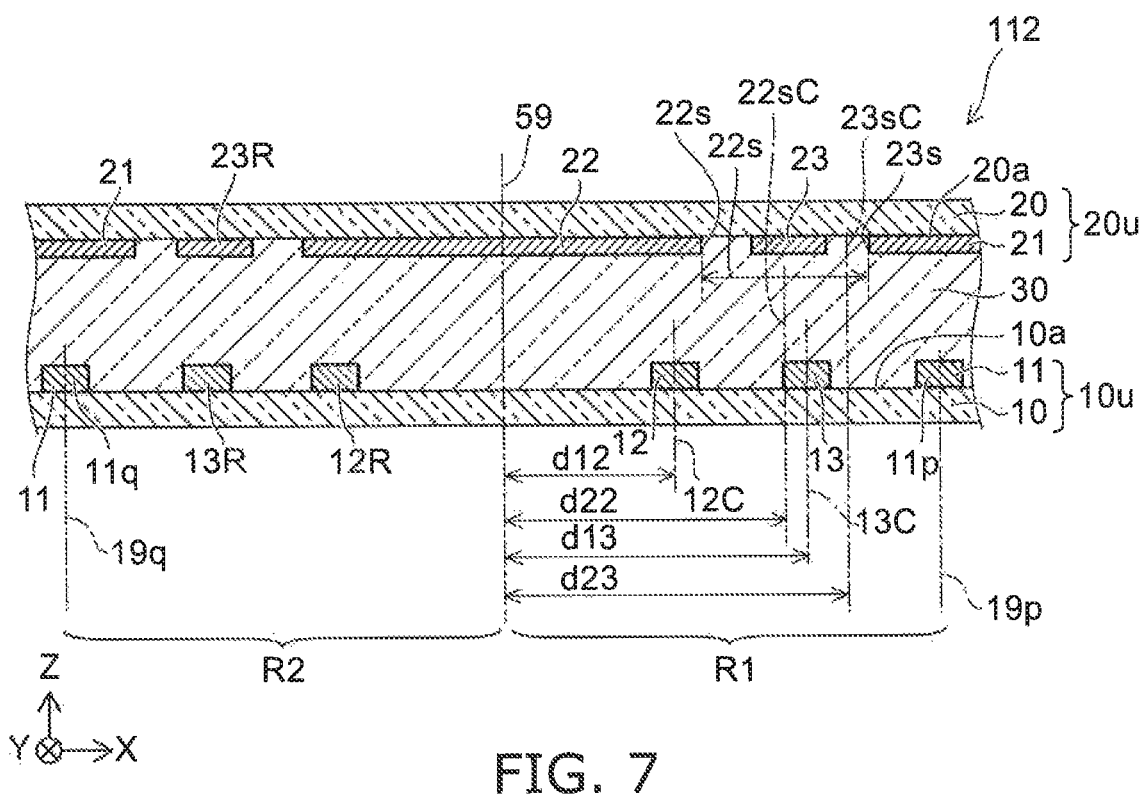
FIG. 7 is a schematic cross-sectional view illustrating the configuration of another liquid crystal optical apparatus according to the first embodiment.

FIG. 7 is a schematic cross-sectional view illustrating the configuration of another liquid crystal optical apparatus according to the first embodiment.

In the liquid crystal optical apparatus 112 according to this embodiment as illustrated in FIG. 7, the first substrate unit 10u further includes a third electrode 13; and the second substrate unit 20u further includes a third opposing electrode 23. Otherwise, the liquid crystal optical apparatus 112 is similar to the liquid crystal optical apparatus 111, and a description is therefore omitted.

The third electrode 13 is provided on the first major surface 10a between the second electrode 12 and the one electrode 11p of the two most proximal first electrodes 11 recited above. The third electrode 13 is separated from the first electrode 11 and the second electrode 12. The third electrode 13 extends in the Y-axis direction. An electrode 13R also is provided in the second region R2 of the first substrate unit 10u.

The third opposing electrode 23 is provided on the second major surface 20a between the first opposing electrode 21 and the second opposing electrode 22. The third opposing electrode 23 is separated from the first opposing electrode 21 and the second opposing electrode 22. The third opposing electrode 23 extends in the Y-axis direction. An electrode 13R also is provided in the second region R2 of the second substrate unit 20u.

The third electrode 13 may include, for example, the same material as that of the first electrode 11, etc. The third opposing electrode 23 may include, for example, the same material as that of the first electrode 11, etc.

A distance d23 along the X-axis direction from the central axis 59 to an X-axis direction center 23sC of a second separating region 23s between the first opposing electrode 21 and the third opposing electrode 23 in the first region R1 is longer than a distance d13 along the X-axis direction from the central axis 59 to an X-axis direction center 13C of the third electrode 13 of the first region R1 when projected onto the X-Y plane.

In this example, the second separating region 23s of the electrodes provided in the second substrate unit 20u forms a pair with the third electrode 13 provided in the first substrate unit 10u. For one pair, the position of the second separating region 23s along the X-axis direction is shifted from the position of the third electrode 13 along the X-axis direction. In other words, an asymmetry is introduced to the disposition of the electrodes in the X-axis direction. Thereby, the refractive index distribution characteristics improve.

In this example, the first separating region 22s of the electrodes provided in the second substrate unit 20u is the region between the first opposing electrode 21 and the second opposing electrode 22. In such a case as well, the distance d22 along the X-axis direction from the central axis 59 to the X-axis direction center 22sC of the first separating region 22s between the first opposing electrode 21 and the second opposing electrode 22 in the first region R1 is longer than the distance d12 along the X-axis direction from the central axis 59 to the X-axis direction center 12C of the second electrode 12 of the first region R1 when projected onto the X-Y plane.

This corresponds to the third opposing electrode 23 and the second separating region 23s being provided inside the first separating region 22s.

In this example, the region between the second opposing electrode 22 and the third opposing electrode 23 which are provided in the second substrate unit 20u forms a pair with the second electrode 12 provided in the first substrate unit 10u.

For example, the potential of the first electrode 11 is set to the VE potential; and the potential of the first opposing electrode 21 is set to the GND potential (the ground potential). The first voltage which is the GND-VE potential difference is applied between the first opposing electrode 21 and the first electrode 11. An electric field that includes a Z-axis direction component is applied in this region.

For example, the potential of the third electrode 13 is set to the VF potential; and the potential of the third opposing electrode 23 is set to the GND potential. The second voltage of the GND-VF potential difference is applied between the third electrode 13 and the third opposing electrode 23. An electric field that includes a Z-axis direction component is applied in this region. In FIG. 7, an electric field that is horizontally asymmetric around the third electrode 13 (asymmetric with respect to a line parallel to the Y-axis direction and passing through the X-axis direction center of the third electrode 13) occurs in the case where the potential of the first electrode 11 is set to a potential that is different from the potential of the third electrode 13. The tilt angle of the liquid crystal molecules increases abruptly in the region of one end (e.g., a lens-end side) of the third electrode 13. In this region, the tilt direction is the same tilt direction as that of the initial alignment. In this region, the refractive index of the liquid crystal layer 30 decreases abruptly; and a Fresnel-type jump of the refractive index occurs. On the other hand, the change of the tilt angle of the liquid crystal molecules is gradual in the region of the other end (the end on the lens-center side) of the third electrode 13. Although the tilt direction is different from the initial alignment in this region, the occurrence of alignment disorder (e.g., reverse tilt and/or twist) of this portion is suppressed because the change of the tilt angle of the liquid crystal molecules is gradual.

There is a region (the second separating region 23s) between the first opposing electrode 21 and the third opposing electrode 23 where an electrode is not provided. Thereby, a refractive index distribution having an asymmetrical lens configuration can be formed at the portion of the second separating region 23s. For example, the Fresnel-type jump of the refractive index can be caused to be abrupt at the portion of the second separating region 23s.

In FIG. 7, for example, the potential of the second electrode 12 is set to the VF potential; and the potential of the second opposing electrode 22 is set to the GND potential. The second voltage of the GND-VF potential difference is applied between the second opposing electrode 22 and the second electrode 12. In this region, an electric field that includes a Z-axis direction component is applied. The VF potential that is applied to the second electrode 12 and the third electrode 13 is lower than the VE potential that is applied to the first electrode 11. Thereby, the change of the tilt angle of the liquid crystal molecules is gradual in the region between the second electrode 12 and the central axis 59. Thereby, the occurrence of the alignment disorder of this portion is suppressed. In this example, the electrode width of the second electrode 12 may be narrower than the electrode width of the third electrode 13.

An alignment (e.g., the vertical alignment) in which the tilt angle of the liquid crystal is large is formed in the liquid crystal layer 30 in the regions where the first voltage and the second voltage are applied. The effective refractive index of these regions is the refractive index ($n_o$) with respect to ordinary light.

On the other hand, for example, the electric field between the first opposing electrode 21 and the first electrode 11 decreases in the horizontal direction toward the lens center. Therefore, the initial alignment (e.g., the horizontal alignment) is formed toward the second electrode 12. The refractive index in this region with respect to the light that vibrates in the X-axis direction is the refractive index ($n_e$) with respect to extraordinary light.

In the refractive index distribution 31, for example, the change of the refractive index (the refractive index difference 31d) is not less than about 20% and not more than about 80% of the difference between the refractive index with respect to extraordinary light and the refractive index with respect to ordinary light.

For example, the refractive index has minimums proximal to the portion of the liquid crystal layer 30 opposing the central portion of the first electrode 11, proximal to the portion of the liquid crystal layer 30 opposing the central portion of the second electrode 12, and proximal to the portion of the liquid crystal layer 30 opposing the central portion of the third electrode 13. The refractive index of the liquid crystal layer 30 has maximums proximal to the central axis 59, proximal to the first separating region 22s, and proximal to the second separating region 23s.

The electrodes of the liquid crystal optical apparatus 112 may be set to various potentials.

For example, the first electrode 11 is set to the VE potential; the first opposing electrode 21 is set to the GND potential; the third electrode 13 is set to the GND potential; the third opposing electrode 23 is set to the VF potential; the second electrode 12 is set to the VF potential; and the second opposing electrode 22 is set to the GND potential. In such a case, the VF potential may be the same as or different from the VE potential. In such a case as well, common inversion driving is applicable.

For example, the first electrode 11 is set to the VE potential; the first opposing electrode 21 is set to the VF potential; the third electrode 13 is set to the VF potential; the third opposing electrode 23 is set to the GND potential; the second electrode 12 is set to the GND potential; and the second opposing electrode 22 is set to the GND potential. In such a case, the VF potential may be the same as or different from the VE potential. In such a case as well, common inversion driving is applicable.

The jump of the Fresnel lens is multiply formed in the liquid crystal optical apparatus 112. Thereby, the optical thickness (e.g., the thickness of the liquid crystal layer 30, the birefringence, etc.) of the lens to obtain the desired lens effects can be reduced. In the liquid crystal optical apparatus 112 as well, asymmetry can be introduced to the electric field distribution by the combination of the electrodes provided in the first substrate unit 10u and the separating regions provided in the second substrate unit 20u; and the characteristics of the refractive index distribution improve. Thereby, a liquid crystal optical apparatus that provides a high-quality display can be provided.

Figure 8:
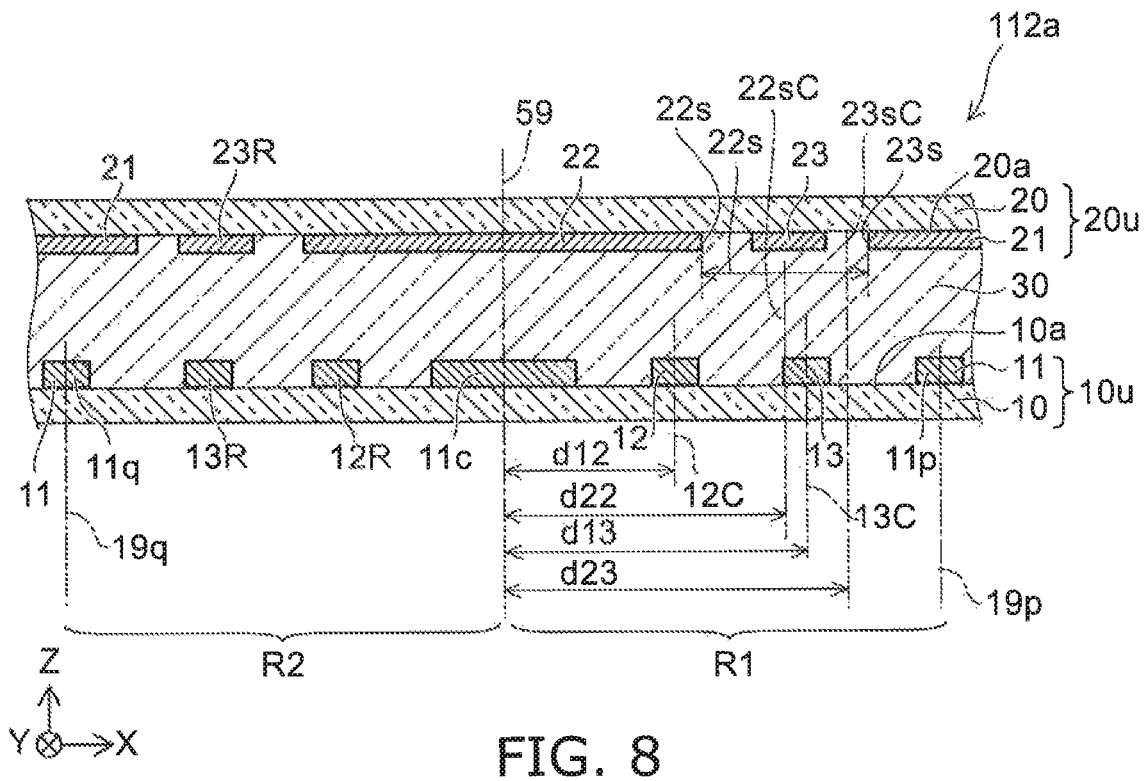
FIG. 8 is a schematic cross-sectional view illustrating the configuration of another liquid crystal optical apparatus according to the first embodiment.

FIG. 8 is a schematic cross-sectional view illustrating the configuration of another liquid crystal optical apparatus according to the first embodiment.

In the liquid crystal optical apparatus 112a according to this embodiment as illustrated in FIG. 8, the first substrate unit 10u further includes the central portion electrode 11c. Otherwise, the liquid crystal optical apparatus 112a is similar to the liquid crystal optical apparatus 112. According to the liquid crystal optical apparatus 112a, a liquid crystal optical apparatus that provides a higher-quality display can be provided.

In the liquid crystal optical apparatuses 112 and 112a, the first substrate unit 10u may further include another electrode such as a fourth electrode, etc., between the third electrode 13 and the first electrode 11. In such a case, the second substrate unit 20u may further include another electrode such as a fourth opposing electrode, etc., between the third opposing electrode 23 and the first opposing electrode 21. In such a case as well, the distance from the central axis 59 to the center of the separating region between the third opposing electrode 23 and the fourth opposing electrode is longer than the distance from the central axis 59 to the center of the fourth electrode. In other words, an asymmetry is introduced. Thus, in the embodiment, the refractive index distribution having the Fresnel lens-like configuration that is formed may include any number of subordinate lenses.

Second Embodiment

Figure 9:
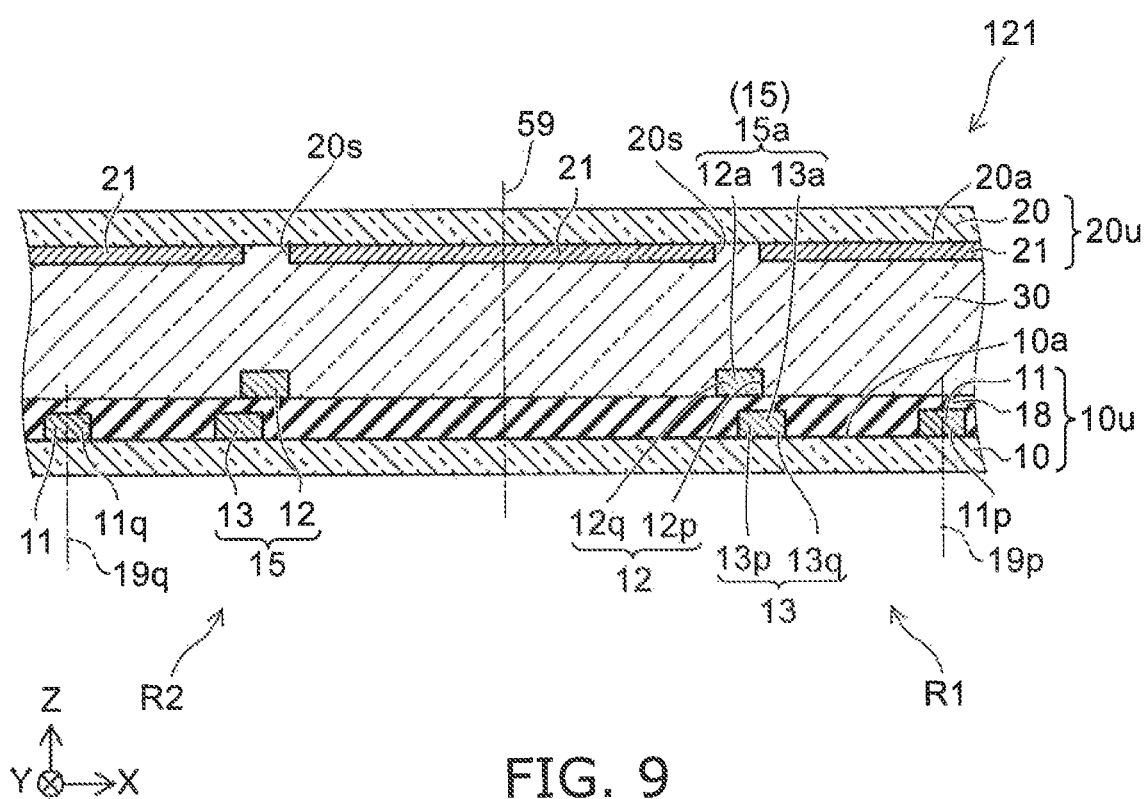
FIG. 9 is a schematic cross-sectional view illustrating the configuration of a liquid crystal optical apparatus according to a second embodiment.

FIG. 9 is a schematic cross-sectional view illustrating the configuration of a liquid crystal optical apparatus according to a second embodiment.

As illustrated in FIG. 9, the liquid crystal optical apparatus 121 according to this embodiment includes the first substrate unit 10u, the second substrate unit 20u, and the liquid crystal layer 30. The liquid crystal layer 30 is provided between the first substrate unit 10u and the second substrate unit 20u.

The first substrate unit 10u includes the first substrate 10, the first electrodes 11, and electrode pairs 15 (e.g., a first electrode pair 15a, etc.). The first substrate 10 has the first major surface 10a. The first electrodes 11 are provided on the first major surface 10a to extend in the Y-axis direction (the first direction). The multiple first electrodes 11 are arranged in the X-axis direction (the second direction) orthogonal to the Y-axis direction.

The multiple electrode pairs 15 are provided on the first major surface. The multiple electrode pairs 15 are provided between the multiple first electrodes 11. For example, one electrode pair 15 is provided in the first region R1; and one other electrode pair 15 is provided in the second region R2.

The electrode pair 15 includes the second electrode 12 (a second electrode 12a, etc.), the third electrode 13 (a third electrode 13a, etc.), and an insulating layer 18. The second electrode 12 and the third electrode 13 extend in the Y-axis direction. The insulating layer 18 is provided between the second electrode 12 and the third electrode 13. In this example, the insulating layer 18 is provided between the second electrode 12 and the first substrate 10; and the third electrode 13 is provided between the first substrate 10 and a portion of the insulating layer 18.

The second electrode 12 has a first superimposed portion 12p overlaying the third electrode 13 and a first non-superimposed portion 12q not overlaying the third electrode 13 when projected onto the X-Y plane (the plane parallel to the first direction and the second direction). The third electrode 13 has a second superimposed portion 13p overlaying the second electrode 12 and a second non-superimposed portion 13q not overlaying the second electrode 12 when projected onto the X-Y plane. In other words, the second electrode 12 is shifted along the X-axis direction from the third electrode 13. In other words, an asymmetry is formed in the one electrode pair 15.

The second substrate unit 20u includes the second substrate 20 and the opposing electrode (the first opposing electrode 21). The second substrate 20 has the second major surface 20a opposing the first major surface 10a. The first opposing electrode 21 is provided on the second major surface 20a. The first opposing electrode 21 includes a slit 20s. The slit 20s overlays at least a portion of each of the multiple electrode pairs 15 when projected onto the X-Y plane. The slit 20s extends in the Y-axis direction.

The first substrate 10, the second substrate 20, the first electrodes 11, the second electrodes 12, the third electrodes 13, the first opposing electrode 21, etc., may include, for example, the materials described in regard to the first embodiment.

The insulating layer 18 may include, for example, $SiO_2$, etc. For example, the thickness of the insulating layer 18 is not less than 100 nm and not more than 1000 nm. Thereby, appropriate insulative properties and a high transmittance are obtained.

For example, the potential of the first opposing electrode 21 is set to the GND potential; the potential of the first electrode 11 is set to the VE potential; the potential of the second electrode 12 is set to the VF potential; and the potential of the third electrode 13 is set to the VF potential. Thereby, an electric field distribution (a distribution of the lines of electric force) that is asymmetrical can be formed at the electrode pair 15. Further, the controllability of the electric field distribution increases by providing the slit 20s. Thereby, the refractive index increase rate along the +X direction can easily be higher than the refractive index decrease rate along the +X direction. The change from the minimum point 32 to the maximum point 33 of the refractive index can easily be abrupt. Therefore, the stray light can be suppressed. Also, the change (the decrease) of the refractive index along the +X direction can be gradual; and good lens effects are easily obtained. In the case where the first opposing electrode 21 is set to the GND potential, an electric field distribution is formed from the second electrodes 12 to the center axis 59; and a refractive index distribution having a lens configuration is formed by the liquid crystal director approaching the initial alignment.

According to this embodiment, the characteristics of the refractive index distribution improve; and a liquid crystal optical apparatus that provides a high-quality display can be provided.

In the description recited above, the VF potential may be the same as or different from the VE potential. In other words, the voltage applied between the first opposing electrode 21 and the first electrode 11 may be different from the voltage applied between the first opposing electrode 21 and the second electrode 12. It is favorable for the voltage applied between the first opposing electrode 21 and the first electrode 11 to be higher than the voltage applied between the first opposing electrode 21 and the second electrode 12. Thereby, the optical characteristics of the refractive index distribution at the lens end are better.

The slit 20s overlays the second electrode 12 (the first non-superimposed portion 12q not overlaying the first superimposed portion 12p) when projected onto the X-Y plane. The slit 20s may overlay at least a portion of the third electrode 13. The slit 20s may overlay at least a portion of the second non-superimposed portion 13q.

Figure 10:
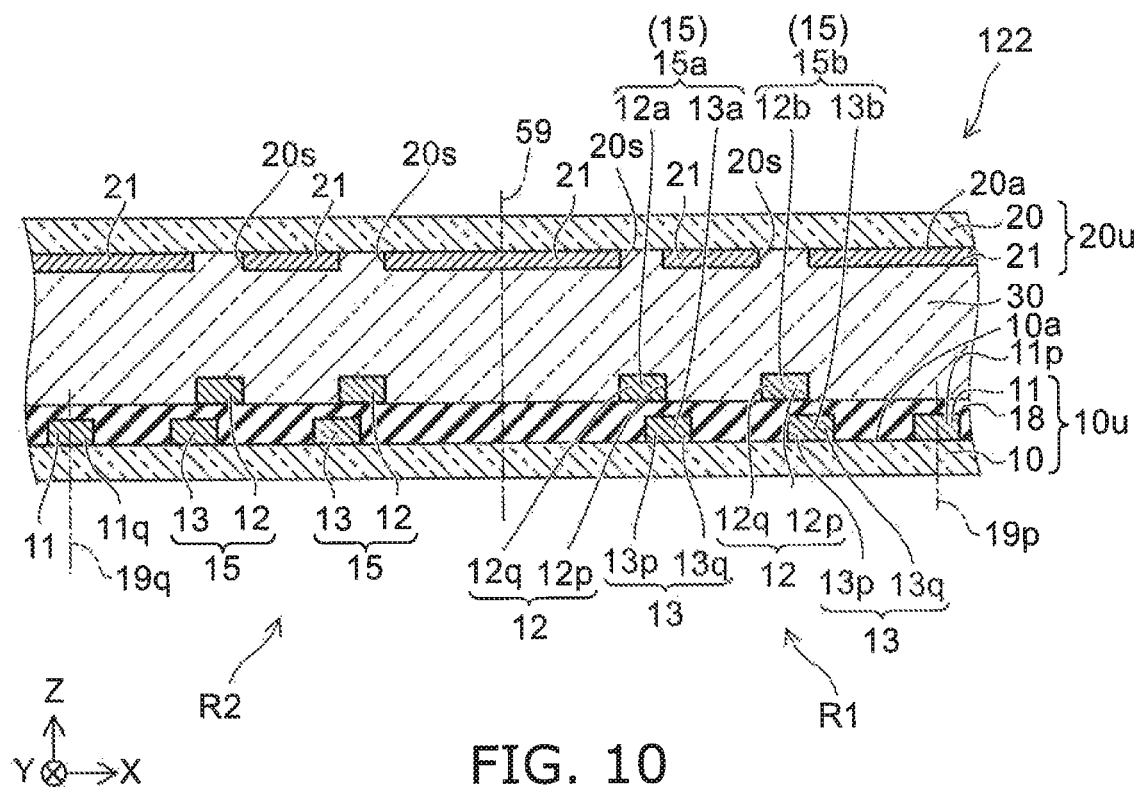
FIG. 10 is a schematic cross-sectional view illustrating the configuration of another liquid crystal optical apparatus according to the second embodiment.

FIG. 10 is a schematic cross-sectional view illustrating the configuration of another liquid crystal optical apparatus according to the second embodiment.

In the liquid crystal optical apparatus 122 according to this embodiment as illustrated in FIG. 10, the first substrate unit 10u includes the multiple electrode pairs 15 (the first electrode pair 15a, a second electrode pair 15b, etc.) in the first region R1.

The second electrode pair 15b includes a second electrode 12b, a third electrode 13b, and the insulating layer 18. The configurations of the second electrode 12b, the third electrode 13b, and the insulating layer 18 are similar to the configurations of the second electrode 12a, the third electrode 13a, and the insulating layer 18 of the first electrode pair 15a, and a description is therefore omitted.

Multiple slits 20s are provided in the second substrate unit 20u. The slits 20s respectively oppose at least portions of the multiple electrode pairs 15. According to the liquid crystal optical apparatus 112 as well, the characteristics of the refractive index distribution improve; and a liquid crystal optical apparatus that provides a high-quality display can be provided.

Figure 11:
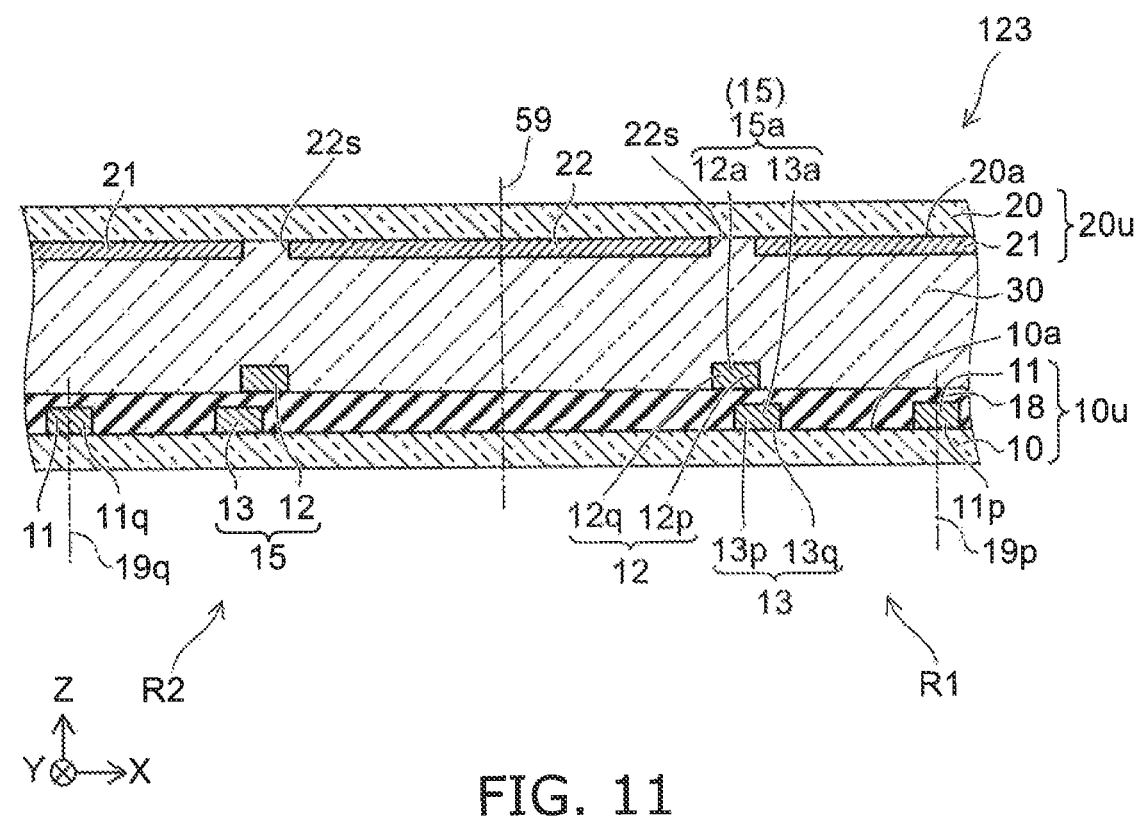
FIG. 11 is a schematic cross-sectional view illustrating the configuration of another liquid crystal optical apparatus according to the second embodiment.

FIG. 11 is a schematic cross-sectional view illustrating the configuration of another liquid crystal optical apparatus according to the second embodiment.

As illustrated in FIG. 11, the liquid crystal optical apparatus 123 according to this embodiment includes the first substrate unit 10u, the second substrate unit 20u, and the liquid crystal layer 30. The liquid crystal layer 30 is provided between the first substrate unit 10u and the second substrate unit 20u. In this example, the configuration of the second substrate unit 20u is different from that of the liquid crystal optical apparatus 121.

The configuration of the first substrate unit 10u is similar to that of the liquid crystal optical apparatus 121. In other words, the first substrate unit 10u includes the multiple first electrodes 11, the first electrode pair 15a, and the first substrate 10 which includes the first major surface 10a. The first electrode pair 15a is disposed on the first major surface 10a in the first region R1 when projected onto the X-Y plane. The first electrode pair 15a includes the second electrode 12 extending in the Y-axis direction, the third electrode 13 extending in the Y-axis direction, and the insulating layer 18 provided between the second electrode 12 and the third electrode 13.

The second substrate unit 20u includes the second opposing electrode 22 in addition to the second substrate 20 and the first opposing electrode 21. The second opposing electrode 22 is provided on the second major surface 20a of the second substrate 20. The second opposing electrode 22 is separated from the first opposing electrode 21 and extends in the Y-axis direction. The second opposing electrode 22 overlays the central axis 59 when projected onto the X-Y plane.

In the first region R1, the first separating region 22s between the first opposing electrode 21 and the second opposing electrode 22 overlays at least a portion of the first electrode pair 15a when projected onto the X-Y plane.

In this example, the first opposing electrode 21 and the second opposing electrode 22 are provided in the second substrate unit 20u. Therefore, the potential of the first opposing electrode 21 that opposes the first electrode 11 corresponding to the lens end can be set to a potential that is different from the potential of the second opposing electrode 22 that overlays the central axis 59 corresponding to the lens center. Thereby, the controllability of the refractive index distribution increases. Also, the refractive index distribution can be controlled with higher precision by disposing the first separating region 22s that opposes at least a portion of the first electrode pair 15a.

Figure 12:
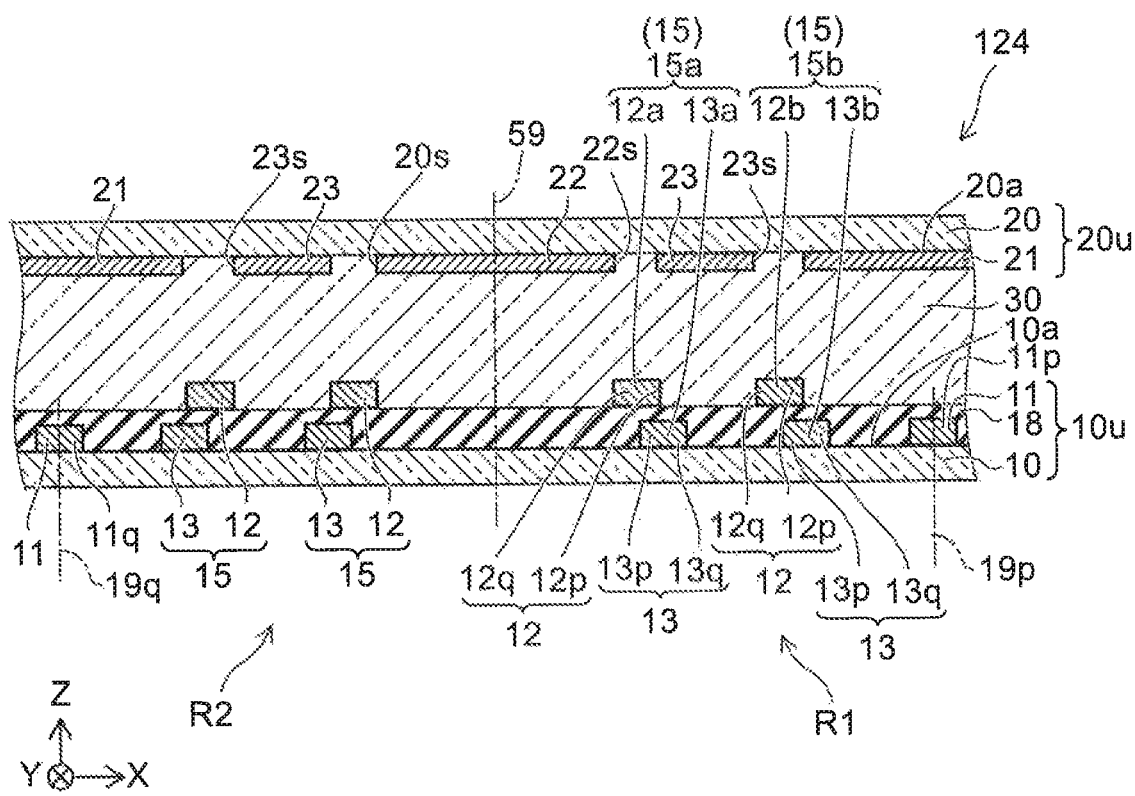
FIG. 12 is a schematic cross-sectional view illustrating the configuration of another liquid crystal optical apparatus according to the second embodiment.

FIG. 12 is a schematic cross-sectional view illustrating the configuration of another liquid crystal optical apparatus according to the second embodiment.

In the liquid crystal optical apparatus 124 according to this embodiment as illustrated in FIG. 12, the first substrate unit 10u further includes the second electrode pair 15b. The second electrode pair 15b is provided on the first major surface 10a between the first electrode pair 15a and the one electrode 11p of the two most proximal first electrodes 11 recited above.

The second electrode pair 15b includes the second electrode 12b of the second electrode pair 15b extending in the Y-axis direction, the third electrode 13b of the second electrode pair 15b extending in the Y-axis direction, and the insulating layer 18 provided between the second electrode 12b and the third electrode 13b.

The second electrode 12b of the second electrode pair 15b has the first superimposed portion 12p overlaying the third electrode 13b of the second electrode pair 15b and the first non-superimposed portion 12q not overlaying the third electrode 13b when projected onto the X-Y plane. The third electrode 13b of the second electrode pair 15b has the second superimposed portion 13p overlaying the second electrode 12b of the second electrode pair 15b and the second non-superimposed portion 13q not overlaying the second electrode 12b when projected onto the X-Y plane.

The second substrate unit 20u further includes the third opposing electrode 23. The third opposing electrode 23 is provided on the second major surface 20a between the first opposing electrode 21 and the second opposing electrode 22. The third opposing electrode 23 is separated from the first opposing electrode 21 and the second opposing electrode 22. The third opposing electrode 23 extends in the Y-axis direction.

In the first region R1, the second separating region 23s between the first opposing electrode 21 and the third opposing electrode 23 overlays at least a portion of the second electrode pair 15b when projected onto the X-Y plane.

Thus, in the case where the electrode pairs 15 are multiply provided, the controllability of the refractive index distribution further increases by providing the first opposing electrode 21, the second opposing electrode 22, and the third opposing electrode 23 to which mutually different voltages can be applied. The controllability of the refractive index distribution improves further by providing the separating regions (the first separating region 22s, the second separating region 23s, etc.) to match the multiple electrode pairs 15. Also, the design margin increases.

The second electrode 12 and the third electrode 13 are interchangeable in the liquid crystal optical apparatuses 121 to 124. In the example recited above, the distance along the X axis between the second electrode 12 and the central axis 59 is shorter than the distance between the third electrode 13 and the central axis 59. The embodiment is not limited thereto; and the distance along the X axis between the second electrode 12 and the central axis 59 may be longer than the distance between the third electrode 13 and the central axis 59. The desired refractive index distribution 31 can be formed by changing the applied voltages to match the configurations of the electrodes.

The central portion electrode 11c may be further provided in the liquid crystal optical apparatuses 121 to 124.

An image display device that includes the image display unit 80 with the liquid crystal optical apparatuses 111, 111a, 111b, 112, 112a, and 121 to 124 and liquid crystal optical apparatuses of modifications of the liquid crystal optical apparatuses 111, 111a, 111b, 112, 112a, and 121 to 124 may be formed. According to such an image display device, an image display device that provides a high-quality display can be provided.

The embodiments may have the following configurations.

Configuration 1

A liquid crystal optical apparatus, comprising:
a first substrate unit including
a first substrate having a first major surface,
multiple first electrodes provided on the first major surface to extend in the first direction, the multiple first electrodes being arranged in a second direction orthogonal to the first direction,
multiple electrode pairs provided on the first major surface in regions between the multiple first electrodes, each of the multiple electrode pairs including,
a second electrode extending in the first direction,
a third electrode extending in the first direction, and
an insulating layer provided between the second electrode and the third electrode,
the second electrode having a first superimposed portion overlaying the third electrode and a first non-superimposed portion not overlaying the third electrode when projected onto a plane parallel to the first direction and the second direction, the third electrode having a second superimposed portion overlaying the second electrode and a second non-superimposed portion not overlaying the second electrode when projected onto the plane;
a second substrate unit including
a second substrate having a second major surface opposing the first major surface, and
an opposing electrode provided on the second major surface, the opposing electrode having a slit extending in the first direction to overlay at least a portion of each of the multiple electrode pairs when projected onto the plane; and
a liquid crystal layer provided between the first substrate unit and the second substrate unit, Configuration 2

A liquid crystal optical apparatus, comprising:
a first substrate unit including
a first substrate having a first major surface,
multiple first electrodes provided on the first major surface to extend in the first direction, the multiple first electrodes being arranged in a second direction orthogonal to the first direction, and
a first electrode pair disposed on the first major surface in a first region between a central axis and one electrode of two most proximal first electrodes when projected onto a plane including the first direction and the second direction, the central axis being parallel to the first direction to pass through a midpoint of a line segment connecting second-direction centers of the two most proximal first electrodes, the first electrode pair including
a second electrode extending in the first direction,
a third electrode extending in the first direction, and
an insulating layer provided between the second electrode and the third electrode,
the second electrode having a first superimposed portion overlaying the third electrode and a first non-superimposed portion not overlaying the third electrode when projected onto the plane, the third electrode having a second superimposed portion overlaying the second electrode and a second non-superimposed portion not overlaying the second electrode when projected onto the plane;
a second substrate unit including
a second substrate having a second major surface opposing the first major surface,
a first opposing electrode provided on the second major surface to extend in the first direction to oppose the first electrodes, and
a second opposing electrode provided on the second major surface and separated from the first opposing electrode to extend in the first direction, the second opposing electrode overlaying the central axis when projected onto the plane; and
a liquid crystal layer provided between the first substrate unit and the second substrate unit,
a first separating region between the first opposing electrode and the second opposing electrode overlaying at least a portion of the first electrode pair in the first region when projected onto the plane.

Configuration 3

The liquid crystal optical apparatus according to configuration 2, wherein:
the first substrate unit further includes a second electrode pair provided on the first major surface between the first electrode pair and the one electrode of the two most proximal first electrodes, the second electrode pair including
a second electrode of the second electrode pair extending in the first direction,
a third electrode of the second electrode pair extending in the first direction, and
the insulating layer provided between the second electrode of the second electrode pair and the third electrode of the second electrode pair,
the second electrode of the second electrode pair having a first superimposed portion overlaying the third electrode of the second electrode pair and a first non-superimposed portion not overlaying the third electrode of the second electrode pair when projected onto the plane, the third electrode of the second electrode pair having a second superimposed portion overlaying the second electrode of the second electrode pair and a second non-superimposed portion not overlaying the second electrode of the second electrode pair when projected onto the plane; and the second substrate unit further includes a third opposing electrode provided on the second major surface between the first opposing electrode and the second opposing electrode and separated from the first opposing electrode and the second opposing electrode to extend in the first direction, a second separating region between the first opposing electrode and the third opposing electrode overlaying at least a portion of the second electrode pair in the first region when projected onto the plane.

According to the embodiments, a liquid crystal optical apparatus and an image display device that provide a high-quality display can be provided.

In the specification of the application, "perpendicular" and "parallel" refer to not only strictly perpendicular and strictly parallel but also include, for example, the fluctuation due to manufacturing processes, etc. It is sufficient to be substantially perpendicular and substantially parallel.

Hereinabove, embodiments of the invention are described with reference to specific examples. However, the invention is not limited to these specific examples. For example, one skilled in the art may similarly practice the invention by appropriately selecting specific configurations of components included in liquid crystal optical apparatuses such as first substrate units, second substrate units, liquid crystal layers, first substrates, second substrates, first to third electrodes, first to third opposing electrodes, central portion electrodes, insulating layers, and drive units and specific configurations of components included in image display devices such as display units, display drive units, etc., from known art; and such practice is included in the scope of the invention to the extent that similar effects are obtained.

Further, any two or more components of the specific examples may be combined within the extent of technical feasibility and are included in the scope of the invention to the extent that the purport of the invention is included.

Moreover, all liquid crystal optical apparatuses and image display devices practicable by an appropriate design modification by one skilled in the art based on the liquid crystal optical apparatuses and the image display devices described above as embodiments of the invention also are within the scope of the invention to the extent that the spirit of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A liquid crystal optical apparatus, comprising:
    a first substrate unit including
        a first substrate having a first major surface,
        a plurality of first electrodes provided on the first major surface to extend in a first direction, the first electrodes being arranged in a second direction orthogonal to the first direction, and
        a plurality of second electrodes provided on the first major surface to extend in the first direction, the second electrode being disposed in a first region between a central axis and one electrode of two most proximal first electrodes, the central axis being parallel to the first direction and passing through a midpoint of the two most proximal first electrodes;
    a second substrate unit including
        a second substrate having a second major surface opposing the first major surface,
        a first opposing electrode provided on the second major surface to extend in the first direction to oppose the first electrodes, and
        a second opposing electrode provided on the second major surface and separated from the first opposing electrode to extend in the first direction, the second opposing electrode overlaying the central axis; and
    a liquid crystal layer provided between the first substrate unit and the second substrate unit,
    a distance along the second direction between the central axis and a center of a first separating region between the first opposing electrode and the second opposing electrode being longer than a distance along the second direction between the central axis and a center of the second electrode.

2. The apparatus according to claim 1, wherein a width of the second electrode along the second direction is narrower than a width of the first separating region along the second direction.

3. The apparatus according to claim 1, wherein the first separating region does not overlay the second electrode.

4. The apparatus according to claim 1, wherein a part of the first separating region overlays the second electrode.

5. The apparatus according to claim 1, wherein the absolute value of the difference between a distance along the second direction from the central axis to a center of the one electrode of the two most proximal first electrodes and the distance along the second direction from the central axis to the center of the first separating region is shorter than ½ of the distance from the central axis to the one electrode of the two most proximal first electrodes.

6. The apparatus according to claim 1, wherein the absolute value of the difference between the distance along the second direction from the central axis to a center of the one electrode of the two most proximal first electrodes and the distance along the second direction from the central axis to the center of the first separating region is not more than a thickness of the liquid crystal layer along a third direction perpendicular to the second direction.

7. The apparatus according to claim 1, wherein:
    the first substrate unit further includes a third electrode provided on the first major surface between the second electrode and the one electrode of the two most proximal first electrodes and separated from the first electrode and the second electrode to extend in the first direction;
    the second substrate unit further includes a third opposing electrode provided on the second major surface between the first opposing electrode and the second opposing electrode and separated from the first opposing electrode and the second opposing electrode to extend in the first direction; and
    a distance along the second direction between the central axis and a center of a second separating region between the first opposing electrode and the third opposing electrode is longer than a distance along the second direction between the central axis and a center of the third electrode.

8. The apparatus according to claim 1, wherein the first substrate unit further includes a central portion electrode provided on the first major surface to extend in the first direction, the central portion electrode overlaying the central axis and being separated from the second electrode.

9. The apparatus according to claim 1, wherein
the first substrate unit further includes an electrode provided in a second region between the central axis and other one electrode of the two most proximal first electrodes,
a configuration of the first substrate unit in the second region has a line symmetry with a configuration of the first substrate unit of the first region.

10. The apparatus according to claim 1, wherein
the first electrodes, the second electrodes, the first opposing electrode, and the second opposing electrode include an oxide including at least one of element selected from the group consisting of In, Sn, Zn, and Ti, and
a thickness of the first electrodes, a thickness of the second electrodes, a thickness of the first opposing electrode, and a thickness of the second opposing electrode are not less than 100 nm and not more than 350 nm.

11. The apparatus according to claim 1, wherein
a liquid crystal included in the liquid crystal layer has a positive dielectric anisotropy, and
an initial alignment of the liquid crystal is a horizontal alignment.

12. The apparatus according to claim 11, wherein
an absolute value of an angle between a director of the liquid crystal and the second direction is not more than 15 degrees.

13. The apparatus according to claim 1, wherein
an orientation direction of the liquid crystal layer proximal to the first substrate unit is antiparallel to an orientation direction of the liquid crystal layer proximal to the second substrate unit.

14. The apparatus according to claim 1, wherein
a length of the first electrodes along the second direction is not less than 5 μm and not more than 300 μm,
a length of the second electrodes along the second direction is not less than 5 μm and not more than 300 μm, and
a length of the first separating region along the second direction is not less than 5 μm and not more than 300 μm.

15. A liquid crystal optical apparatus, comprising:
a first substrate unit including
a first substrate having a first major surface,
a plurality of first electrodes provided on the first major surface to extend in the first direction, the first electrodes being arranged in a second direction orthogonal to the first direction, and
a first electrode pair disposed on the first major surface in a first region between a central axis and one electrode of two most proximal first electrodes, the central axis being parallel to the first direction and passing through a midpoint of the two most proximal first electrodes, the first electrode pair including
a second electrode extending in the first direction,
a third electrode extending in the first direction, and
an insulating layer provided between the second electrode and the third electrode,
the second electrode having a first superimposed portion overlaying the third electrode and a first non-superimposed portion not overlaying the third electrode, the third electrode having a second superimposed portion overlaying the second electrode and a second non-superimposed portion not overlaying the second electrode;
a second substrate unit including
a second substrate having a second major surface opposing the first major surface,
a first opposing electrode provided on the second major surface to extend in the first direction to oppose the first electrodes, and
a second opposing electrode provided on the second major surface and separated from the first opposing electrode to extend in the first direction, the second opposing electrode overlaying the central axis; and
a liquid crystal layer provided between the first substrate unit and the second substrate unit,
a first separating region between the first opposing electrode and the second opposing electrode overlaying at least a portion of the first electrode pair in the first region.

16. The apparatus according to claim 15, wherein
the first substrate unit further includes a second electrode pair provided on the first major surface between the first electrode pair and the one electrode of the two most proximal first electrodes, the second electrode pair including
a second electrode of the second electrode pair extending in the first direction,
a third electrode of the second electrode pair extending in the first direction, and
the insulating layer provided between the second electrode of the second electrode pair and the third electrode of the second electrode pair,
the second electrode of the second electrode pair having a first superimposed portion overlaying the third electrode of the second electrode pair and a first non-superimposed portion not overlaying the third electrode of the second electrode pair, the third electrode of the second electrode pair having a second superimposed portion overlaying the second electrode of the second electrode pair and a second non-superimposed portion not overlaying the second electrode of the second electrode pair; and
the second substrate unit further includes a third opposing electrode provided on the second major surface between the first opposing electrode and the second opposing electrode and separated from the first opposing electrode and the second opposing electrode to extend in the first direction,
a second separating region between the first opposing electrode and the third opposing electrode overlaying at least a portion of the second electrode pair in the first region.

17. The apparatus according to claim 15, wherein
the insulating layer includes $SiO_2$, and
a thickness of the insulating layer is not less than 100 nm and not more than 1000 nm.

18. An image display device, comprising:
a liquid crystal optical apparatus including:
a first substrate unit including
a first substrate having a first major surface,
a plurality of first electrodes provided on the first major surface to extend in a first direction, the first electrodes being arranged in a second direction orthogonal to the first direction, and
a plurality of second electrodes provided on the first major surface to extend in the first direction, the second electrode being disposed in a first region between a central axis and one electrode of two most proximal first electrodes, the central axis being parallel to the first direction and passing through a midpoint of the two most proximal first electrodes;

a second substrate unit including
    a second substrate having a second major surface opposing the first major surface,
    a first opposing electrode provided on the second major surface to extend in the first direction to oppose the first electrodes, and
    a second opposing electrode provided on the second major surface and separated from the first opposing electrode to extend in the first direction, the second opposing electrode overlaying the central axis; and
a liquid crystal layer provided between the first substrate unit and the second substrate unit,
a distance along the second direction between the central axis and a center of a first separating region between the first opposing electrode and the second opposing electrode longer than a distance along the second direction between the central axis and a center of the second electrode; and
an image display unit stacked with the liquid crystal optical apparatus, the image display unit including a display unit configured to cause light including image information to be incident on the liquid crystal layer.

19. The device according to claim 18, further comprising a drive unit configured to apply a first voltage between the first opposing electrode and the first electrodes and a second voltage between the second opposing electrode and the second electrodes.

20. The device according to claim 19, further comprising
the first substrate unit further includes a third electrode provided on the first major surface between the second electrode and the one electrode of the two most proximal first electrodes and separated from the first electrode and the second electrode to extend in the first direction;
the second substrate unit further includes a third opposing electrode provided on the second major surface between the first opposing electrode and the second opposing electrode and separated from the first opposing electrode and the second opposing electrode to extend in the first direction; and
a distance along the second direction between the central axis and a second-direction center of a second separating region between the first opposing electrode and the third opposing electrode in the first region is longer than a distance along the second direction between the central axis and a second-direction center of the third electrode of the first region.

* * * * *